C. JERABEK.
AUTO TIRE TUBE CARRIER.
APPLICATION FILED JAN. 20, 1920.
1,351,517.
Patented Aug. 31, 1920.
3 SHEETS—SHEET 1.
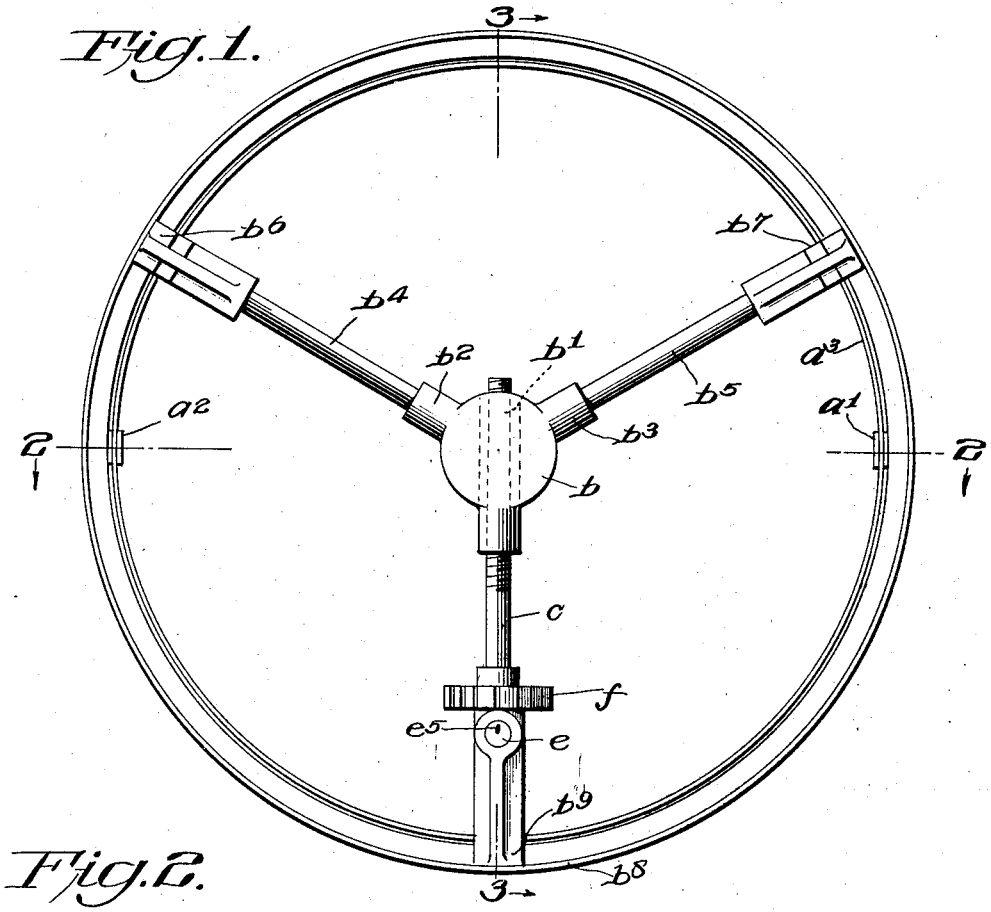
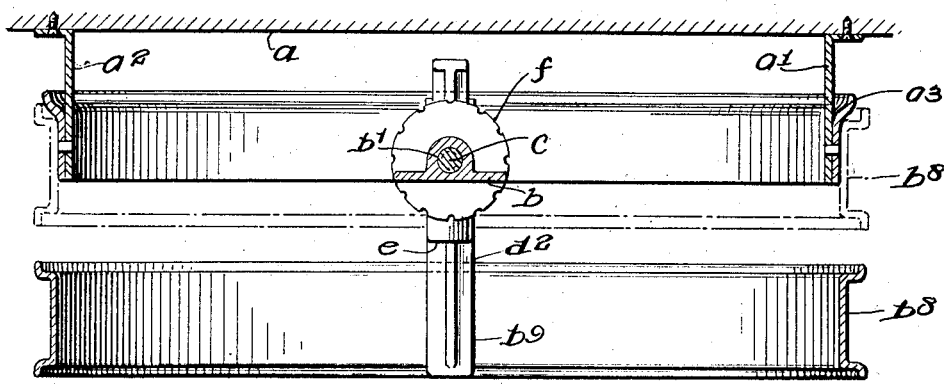
INVENTOR.
Charles Jerabek
BY J. Walter Douglas
ATTORNEY.

C. JERABEK.
AUTO TIRE TUBE CARRIER.
APPLICATION FILED JAN. 20, 1920.
1,351,517.
Patented Aug. 31, 1920.
3 SHEETS—SHEET 2.
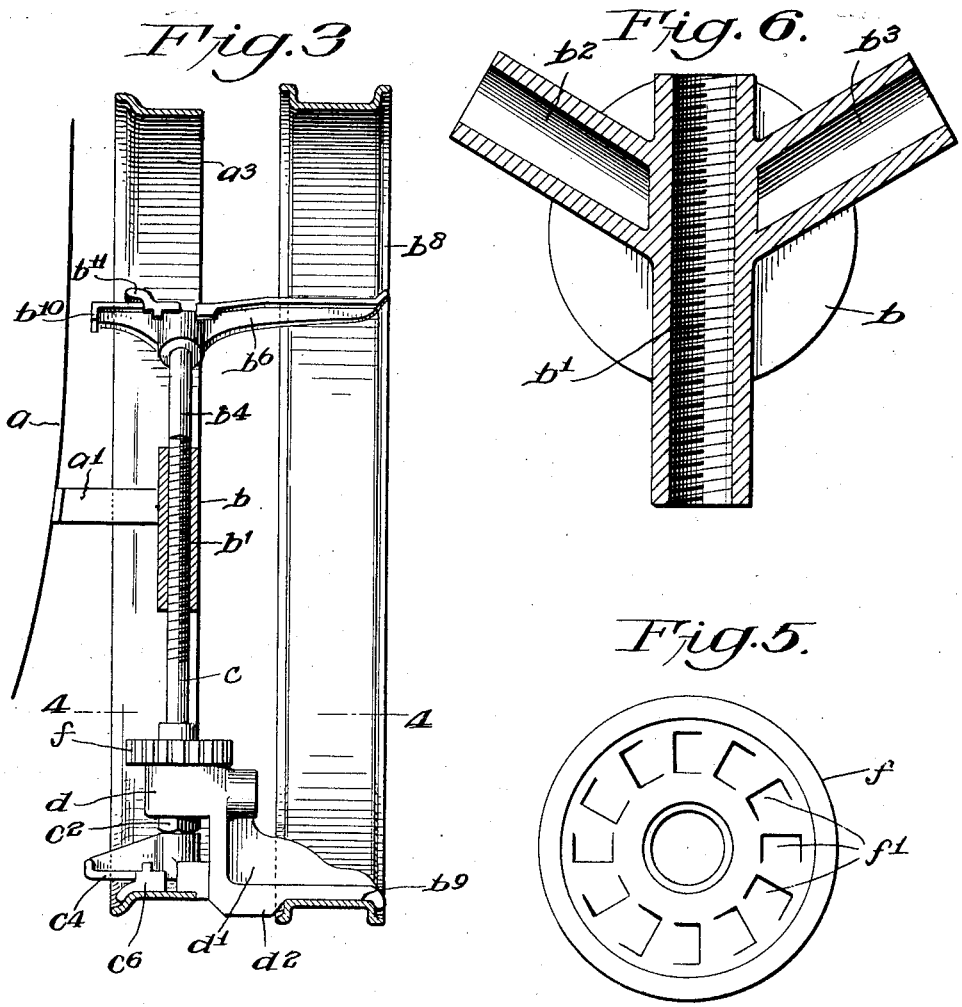
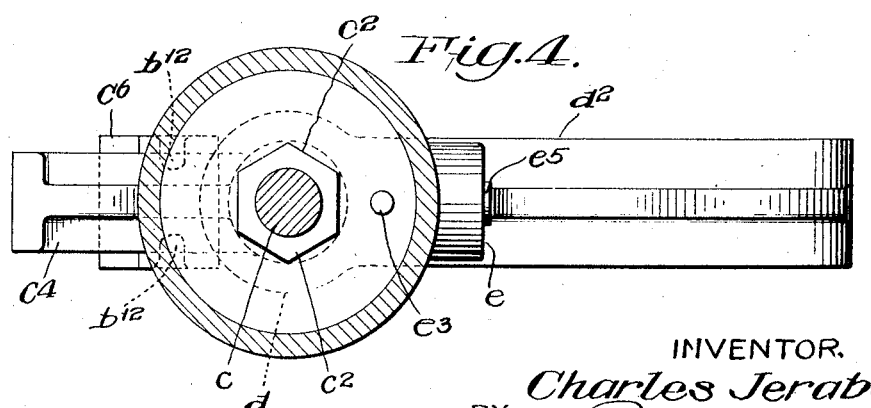
INVENTOR.
Charles Jerabek,
BY
ATTORNEY.

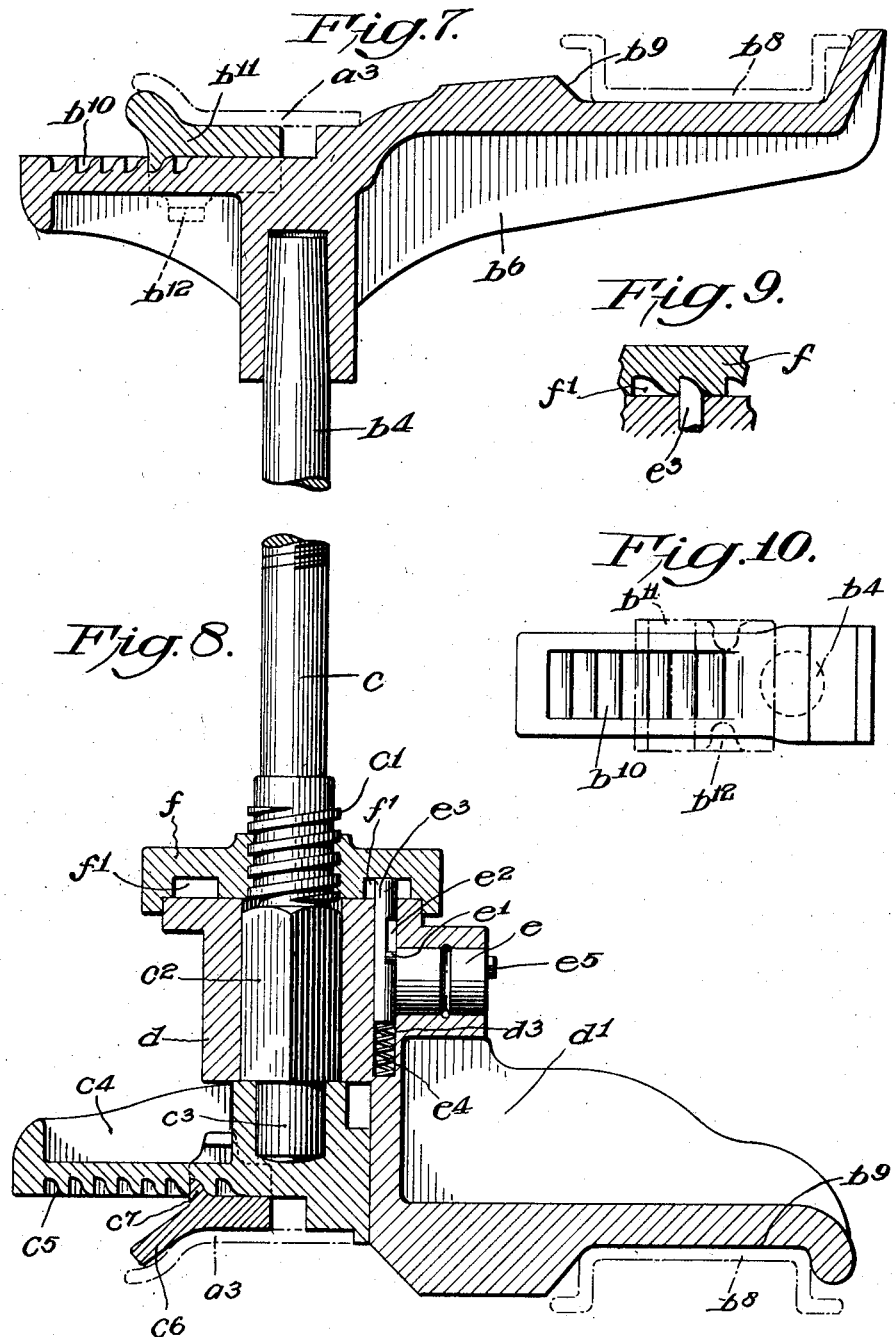

UNITED STATES PATENT OFFICE.

CHARLES JERABEK, OF PHILADELPHIA, PENNSYLVANIA, ASSIGNOR TO LOUIS ROTHSCHILD, OF PHILADELPHIA, PENNSYLVANIA.

AUTO-TIRE-TUBE CARRIER.

1,351,517. Specification of Letters Patent. Patented Aug. 31, 1920.

Application filed January 20, 1920. Serial No. 352,676.

*To all whom it may concern:*

Be it known that I, CHARLES JERABEK, a citizen of the United States, residing at the city of Philadelphia, in the county of Philadelphia and State of Pennsylvania, have invented certain new and useful Improvements in Auto-Tire-Tube Carriers, of which the following is a specification.

My invention relates to a device which is supported from a motor car for clenchingly holding a series of tire-tubes against unauthorized detachment, but not so as to prevent ready removal when required for use; and in such connection my invention relates to the structural arrangement of the carrier for the defined purpose.

The principal objects of my invention, are first, to provide a tire-tube carrier of simplified construction which is comparatively economical to manufacture and is easily assembled and manipulated for lockingly holding a plurality of tire-tubes in rims of the carrier therefor; and the members of the carrier readily adjustable for clenchingly holding the tire-tubes in locked condition against unauthorized demountability, yet not so as to prevent quick removal when required, for use; and second, to provide a tire-tube carrier so arranged as to be readily adapted to rims of different dimensions for complemental size tire-tubes in providing an all around tire tube carrier for application to any of the many different makes of motor vehicles.

The nature, characteristic features and scope of my present invention will be more fully understood from the following description taken in connection with the accompanying drawings forming part hereof, in which—

Figure 1 is a front elevation view of an auto tire-tube carrier, embodying the particular main features of my invention.

Fig. 2 is a horizontal sectional view on the line 2—2 of Fig. 1.

Fig. 3 is a vertical sectional view on the line 3—3 of Fig. 1.

Fig. 4 is an enlarged horizontal sectional elevation on the line 4—4 of Fig. 3, showing the hexagonal portion of the vertical spindle, having a fixed shoe as part thereof and with a shiftable foot and the movable recessed shoe as part of a sleeve turnable on the said spindle and the plunger tongue of the locking-means mounted in the said sleeve.

Fig. 5 is an underneath plan view of the notched ring forming part of the locking-means of the carrier.

Fig. 6 is a vertical central sectional view of the yoke of the carrier device, showing the threaded bore for the vertical spindle to engage and flaring bearing pockets for housing the spindles of the fixed shoe members of the said carrier device.

Fig. 7 is an enlarged view partly in section and partly in side elevation of one of the fixed shoe members of the device, showing the right hand recessed part of the said member formed for reception of a tire-tube flanged rim, and the left hand ratched surface member provided with a shiftable toothed foot for providing a variable recess for reception of a tire-tube rim.

Fig. 8 is an enlarged broken sectional view partly in side elevation, showing the vertical spindle having threaded and hexagonal-shaped portions and a shoe provided with a ratcheted surface and toothed foot for the reception of different size tire-tube rims, and with a sleeve having as a part a locking-means and a recessed shoe, and also showing the notched ring as part of the locking-means of the said device.

Fig. 9 is an enlarged fragmentary sectional detailed view, showing the form of notches of the locking-means and the plunger tongue of the said means to engage in a notch of said means; the said view disclosing in one direction that the said tongue may be turned from notch to notch without affecting the locking effect of the said device; and Fig. 10 is an enlarged underneath plan view of the left hand shoe of the device of Figs. 7 or 8, showing the shiftable foot with overlapping lips for engaging the shoe surfaces on both sides and thereby holding in any required shiftable position the foot in engagement with the ratcheted surface of the said shoe member.

Referring to the drawings $a$, represents the back of a motor car-body from which extend brackets and $a^1$ and $a^2$, Figs. 2 and 3, to which a flanged rim $a^3$, is suitably secured.

The tire-tube device of my invention is applied as hereinafter fully explained.

This device consists of a yoke $b$, having a threaded bore $b^1$, and two flaring bearing pockets $b^2$ and $b^3$, as clearly shown in Fig. 6. Into these bearing pockets are fitted spindles $b^4$ and $b^5$, provided at the outer ends with clamping shoes $b^6$ and $b^7$, for engaging tire rims $a^3$ and $b^8$. These shoes are respectively provided on one side, the right hand one, with a recess $b^9$, for the reception of a tire-tube, and the other shoe has formed in one surface a ratchet $b^{10}$, and is provided with a shiftable toothed foot $b^{11}$, having overlapping lips $b^{12}$, to engage both sides of the shoe and thus forming a means to permit of the ready shifting of the foot along the ratcheted surface of the said shoe and into a position to form a recess of varying length to suit a tire rim as $a^3$, of any required size for thereby holding a tire-tube not shown, in a locked position thereon and as will be hereinafter more fully explained.

Through the threaded bore $b^1$, of the yoke $b$, engages a vertical spindle $c$, as clearly shown in Figs. 1 and 3. This spindle $c$, is formed in the lower portion with an enlarged threaded surface $c^1$, and with a hexagonal-shaped portion $c^2$, having a terminal bearing $c^3$, as shown in Fig. 8, which engages a shoe $c^4$. This shoe is provided with a ratcheted surface $c^5$, and with which engage the teeth $c^7$, of a foot $c^6$, Fig. 8, to provide one of the recessed shoes for reception and holding in place of one of the tire rims as $a^3$, in Figs. 2 and 8.

A sleeve $d$, is slidably mounted on the spindle $c$, so as to engage the hexagonal-shaped portion $c^2$, of the said spindle. This sleeve is provided with a recessed shoe $d^1$, Fig. 8, for reception of a tire rim as $b^8$. The extension of the sleeve $d$, in that part forming the body of the recessed shoe $d^1$, is provided with a locking-means $e$, of the "Yale" or other type. In the sleeve body $d^1$, as clearly illustrated in Fig. 8, is provided a tongue $e^1$, shiftably engaging the slot $e^2$, of a vertically arranged plunger $e^3$, held in position in the slotted chamber $d^3$, of the sleeve body $d^1$, by means of a helical spring $e^4$, holding normally the plunger $e^3$, in a notch of a recessed ring $f$. The notch formation $f^1$, of this ring is arranged preferably as shown in Figs. 8 and 9, and so as to permit of the turning while engaged by the plunger $e^3$, in one direction without affecting the locked relationship between the ring $f$, and the sleeve $d$, and at the same time not to permit in such condition of unwinding of the said ring on the threaded portion $c^1$, of the spindle $c$, until the plunger $e^3$ is released from the said ring $f$. To release a tire-tube, not shown, from one of the rims as $b^8$, the lock $e$, by means of a key inserted in the slot $e^5$, is turned to cause the tongue $e^1$, in the position shown in Fig. 8, to depress the plunger $e^3$, so as to compress the spring $e^4$, by which it is held in normal position, whereby the ring $f$, can then be turned on the threaded portion $c^1$, of the spindle $c$, to permit the sleeve $d$, to be elevated on the portion $c^2$, of the spindle $c$, and thus the rim $b^8$, of a tire-tube held thereon to be readily removed. The reverse mode of operation as hereinabove described of the said members will restore a tire-tube to the carrying rim $b^8$, for safe holding from the back of a motor car and against unauthorized removal until required to be again released for the desired purpose.

Having thus described the nature and objects of my invention, what I claim as new and desire to secure by Letters Patent is:—

1. An auto tire-tube carrier, comprising a yoke having shoes, each having a recess in one part and in the other a shiftable foot, for clenchingly engaging a rim of a tire-tube, a spindle engaging said yoke and provided with threaded and unthreaded portions and having a shoe with a shiftable foot, a sleeve mounted on said spindle and having a recessed shoe, a locking-means provided with a plunger and a notched ring threading with said spindle and arranged to permit the plunger of said means to engage a notch of said ring, substantially as and for the purposes described.

2. An auto tire-tube carrier, comprising a yoke having shoes, each having a recess in one part and in the other a shiftable foot for clenchingly engaging the rim of a tire-tube, a spindle threaded to said yoke having a hexagonal-shaped portion, a sleeve for engaging the hexagonal portion of said spindle provided with a locking-means having a spring actuated plunger and a notched ring for engaging the plunger of said means, substantially as and for the purposes described.

3. An auto tire-tube carrier, comprising a yoke having shoes, one recessed and the other having a shiftable foot for clenchingly engaging a tire-tube rim, a spindle threading with said yoke, a sleeve arranged to engage said spindle and provided with a locking-means having a spring actuated plunger, a notched ring threading with said spindle and arranged to permit of said plunger being engaged in a notch of said ring and the said sleeve provided with a recessed shoe for a tire-tube rim, substantially as and for the purposes described.

4. An auto tire-tube carrier, comprising a yoke supporting the spindles of recessed shoes connected therewith, said yoke having a vertical spindle threaded thereto and having an unthreaded portion and a shoe having a shiftable foot, a sleeve slidable on said spindle and arranged to lockingly engage the unthreaded portion of said spindle, said sleeve provided with a locking-means having a spring actuated plunger, a notched ring mounted on said spindle and arranged to permit of said plunger engaging a notch of said ring, substantially as and for the purposes described.

In witness whereof, I have hereunto set my signature in the presence of two subscribing witnesses.

CHARLES JERABEK.

Witnesses:
J. WALTER DOUGLASS,
ROSE E. MCCARTHY.